United States Patent [19]

Waldstrom

[11] Patent Number: 5,212,960
[45] Date of Patent: May 25, 1993

[54] METHOD AND A SYSTEM FOR PRODUCING EXTRUDED EDIBLE ICE PRODUCTS

[75] Inventor: Ejvind Waldstrøm, Tranbjerg, Denmark

[73] Assignee: O.G. Hoyer A/S, Hojbjerg, Denmark

[21] Appl. No.: 781,131

[22] PCT Filed: Jul. 9, 1990

[86] PCT No.: PCT/DK90/00177
§ 371 Date: Jan. 7, 1992
§ 102(e) Date: Jan. 7, 1992

[87] PCT Pub. No.: WO91/00693
PCT Pub. Date: Jan. 24, 1991

[30] Foreign Application Priority Data

Jul. 7, 1989 [DK] Denmark .................. 3369/89

[51] Int. Cl.⁵ .............................. B02C 18/02
[52] U.S. Cl. ........................ 62/320; 62/345; 99/537; 425/308; 426/518
[58] Field of Search .......... 62/320, 345; 426/513, 426/515, 516, 518, 524; 425/308, 310, 315, 378.1; 99/537, 538

[56] References Cited

U.S. PATENT DOCUMENTS

| | | | |
|---|---|---|---|
| 3,436,927 | 4/1969 | Gruber | 62/345 X |
| 4,060,998 | 12/1977 | Bernard | 62/320 |
| 4,261,940 | 4/1981 | Bussey, Jr. | 425/308 X |
| 4,689,236 | 8/1987 | Pinto | 426/516 X |
| 4,732,555 | 3/1988 | Whitelaw | 425/310 X |
| 4,741,916 | 5/1988 | Heidel et al. | 426/516 X |
| 4,882,176 | 11/1989 | Koyama et al. | 426/524 X |
| 5,037,350 | 8/1991 | Richardson et al. | 426/518 X |

Primary Examiner—William E. Tapolcai
Attorney, Agent, or Firm—Antonelli, Terry, Stout & Kraus

[57] ABSTRACT

A method and system for producing extruded edible ice products wherein an extruded string is conveyed unbroken through a continuous freezing zone, with only constrictions or notches being provided in the string by transversely movable tools while the ice substance is still formable. After a hard freezing of the extruded string, single bodies are separated from the extruded string by a simple successive breaking action on a front end of the string, and a desired distance between individual severed bodies can be produced by permitting the bodies to fall onto a conveyor moving at a speed which is higher than a conveying speed of the extruded string.

8 Claims, 1 Drawing Sheet

U.S. Patent       May 25, 1993       5,212,960
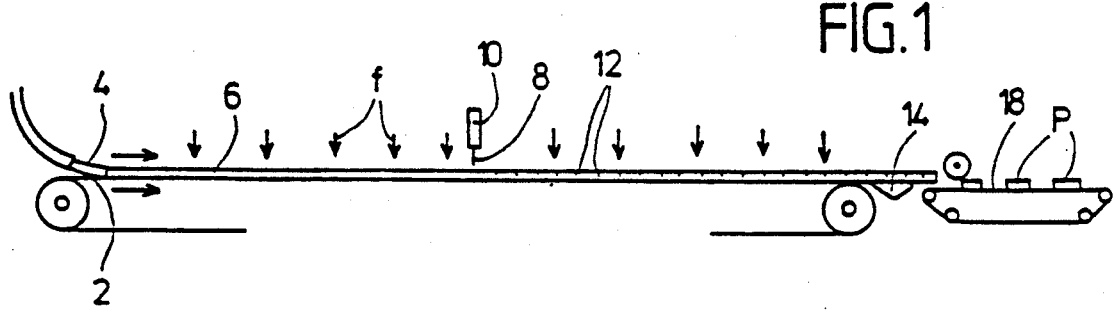
FIG.1
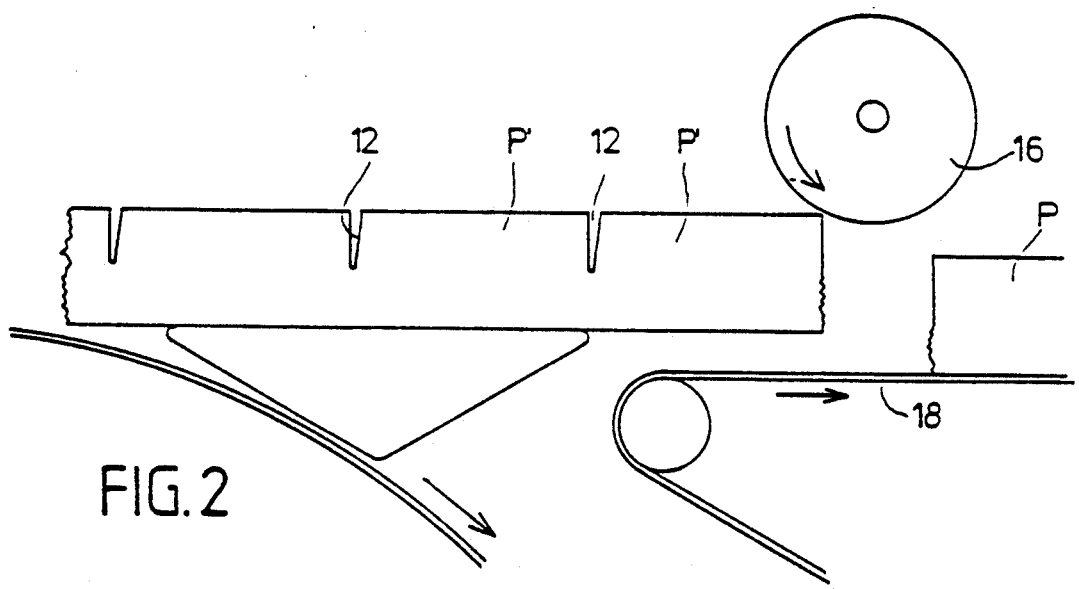
FIG.2
FIG.3
FIG.4

METHOD AND A SYSTEM FOR PRODUCING EXTRUDED EDIBLE ICE PRODUCTS

FIELD OF THE INVENTION

The present invention relates to a method of producing extruded edible ice products, typically round bar shaped ice bodies optionally coated with chocolate or another material. That kind of simple bodies are well suited to be manufactured by extrusion, as they can just be cut off in desired lengths from an extruded string of frozen ice material.

BACKGROUND OF THE INVENTION

By extrusion, ice substance is soft and formable, e.g. at a temperature of $-5°$, and, for ensuring a real separation between the extruded bodies by the cutting of the extruded string, the extruded string should be further frozen before the cutting takes place. It is a usual practice, therefore, that an ice sausage string, or preferably a number of parallel ice strings, be extruded onto a conveyor belt which brings the string through a first freezing zone, in which the ice material is frozen to a 'medium low' temperature by which the material is reasonably stiff or self carrying, yet still easily cuttable, whereafter the string is conveyed through a cutting station for being cut into single bodies, which, on the same or a further conveyor, are brought through a following freezing zone in which they are hard frozen. Such a final freezing will often be effected in a special freezing store after packaging or wrapping of the bodies, but if the bodies prior to the packing should be coated with some coating material from a liquid state thereof, then the bodies should be hard frozen prior to such coating being effected, e.g. by dipping of the bodies in a bath of the coating material, as this material will be 'warm' relative to the ice material. Particularly where it is required for this reason to hard freeze the bodies prior to a possible packaging or wrapping and thus prior to their transfer to a freezing store the basically simple extrusion process will be less simple, because normally use should be made of two different freezing tunnel units and an intermediate cutting station.

SUMMARY OF THE INVENTION

The aim underlying the present invention essentially resides in providing a method and apparatus which simplifies the production of extruded edible ice products, with advantage being taken of the special character of the ice material in a hard frozen condition.

According to the present invention, the ice sausage or string, while being in a medium frozen condition, is subjected to a pressure shaping for forming successive breaking curbs by a simple pressing in of a curb forming tool into a top side of the sausage or string, whereafter the still coherent sausage is conveyed further through a hard freezing zone. At the exit of the hard freezing zone, the single ice bodies are broken off from the sausage or string and are entirely frozen or stiff. By a completely uncritical breaking influence, the sausage or string will break just at a previously shaped curb recess and, no precautions are necessary for avoiding a rejoining between the ends of the previously coherent body since such rejoining will be excluded due to the fully frozen condition of the material.

The adding of a breaking curb can be effected in a very simple manner inside a continuous freezing tunnel, in which the conveyor belt may pass in one stretch, inasfar as the curb can be shaped by a simple pressing down of a tool, which shall only have to intrude noticeably into the top side of the ice sausage, but not cause any severing of the sausage all the way down to the top side of the conveyor belt, this otherwise being a major problem. Thus, for the entire process it is sufficient to use a single tunnel and a single, continuous conveyor belt, which amounts to a considerable simplification of the conventional technique.

The invention is, exemplified on the accompanying drawing, which shows, inter alia, that the breaking off of the ice bodies may be affected in an extremely simple manner in that the front end of the hard frozen ice sausage at an exit area from a supporting anvil meets with an overlying roller serving to force the projecting front end of the ice sausage downwardly, such that the front end portion will break off without difficulties just at the previously shaped curb. The broken off front end portions or ice bodies may fall down onto a further conveyor belt bringing them further to a wrapping machine or to a station in which they are provided with a coating material.

As a further important advantage it will be achieved that each one of the extruded bodies will be stabilized on the conveyor belt in and by the bodies being lengthwise coherent. Even entirely round bodies may then remain rested on the belt when on their way they are exposed to local vibrations on the belt.

The fracture surfaces appearing after the breaking off of the bodies will reveal themselves only as rather small areas at the ends of the elongated bodies, i.e. they will be quite discrete and will practically disappear by a following coating of the bodies. Following the invention is described in more detail with reference to the drawing, in which:

BRIEF DESCRIPTION OF THE DRAWINGS

FIG. 1 is a schematic side view of an extruder according to the invention,

FIG. 2 is an enlarged side view of the outlet end of the extruder,

FIG. 3 is a top view of an extruded string, and

FIG. 4 is a side view of an extrusion area.

DETAILED DESCRIPTION

In FIG. 1 is shown a conveyor 2, above the left hand end of which there is mounted a slightly inclined extruder tube 4, which receives an ice material through a hose 5 and extrudes the material in a string 6 carried forwardly by the conveyor belt. Normally there will be arranged a plurality of extruder or nozzle tubes 4 in a transverse row across a suitably broad conveyor.

On the conveyor the string 6 is carried through a freezing zone marked by vertical arrows f that may represent a blast of cold air. Inside the freezing zone there is mounted above each string 6—or transversely above all of the strings—a vertical blade 8, which, e.g. by a working cylinder 10, is depressable into the ice material, which at the particular place has been cooled down sufficiently to allow for the depression of the blade 8 to create a permanent or area of construction curb 12 in the material. The curbs 10 are shaped during the passing by of the string, with mutual spacings corresponding to the desired length of the finished products, and the strings are thereafter moved further forwardly in the freezing zone until they have become hard frozen.

At the delivery end of of the conveyor the strings 6 pass onto an anvil 14, which as also shown in FIG. 2 is mounted just outside the associated end roller of the conveyor flush with the top side of the conveyor belt. When the end of the string 6 has passed from the rear edge of the anvil a distance corresponding to the length of a product body P' the top side of the string 6 will meet a stationary, rotating roller 16, the bottom of which is located at a level slightly lower than the top side of the string, and the foremost product body P', therefore, will be pressed down so as to break off in the area beneath the foremost curb 12.

The body P thus broken off falls to an underlying conveyor belt 18, which is moved somewhat faster than the string 6, such that a desired distance will be produced between the consecutive bodies P. These bodies P are then advanced for further treatment or packaging.

In FIG. 3 it is indicated that instead of a narrow blade 8 it is possible to use shaping tools 20 that will form a portion of the body ends with a desired shape. As shown, an approximate rounded shape can be achieved by pressing such tools inwardly from both sides.

It has been mentioned that that the strings 6 should be noticeably cooled down prior to the curbs or areas of constriction 12 being shaped, but it is possible, nevertheless, to carry out such shaping already at the outlet from the extruder tube 4, particularly if the ice material has at this place been cooled down a little more than usually or if the material is otherwise, due to its composition, suited for such shaping; the material is not bound to be just an edible icecream substance. Also, a further possibility will be to shape the product body ends, while coherent, by a controlled extruder nozzle 22, e.g. a nozzle comprising an iris diaphragm or one or more wall or edge portions which may be displaced in a controllable manner for narrowing or widening the nozzle opening at desired portions thereof, particularly at the top and/or the sides of the string. When suitably controlled, e.g. through the illustrated control conduit 24, the nozzle will then be usable for shaping the front and rear ends of the product bodies with varying or mutually different shapes, just as the bodies can be produced with other cross profiles, only less deep than the curbs or means of constrictions 12. Also, the product bodies may then be shaped fully or partially conically.

I claim:

1. A method of producing extruded ice cream products the method comprising the steps of:
    delivering extruded material while still being deformable as an unbroken extruded string of ice material,
    conveying the extruded strings through a freezing zone,
    subjecting the extruded string after passing a first partial length of the freezing zone to a constriction formation mutually spaced positions corresponding to a desired length of the ice cream products without breaking the extruded string,
    further conveying the extruded string through a remaining length of the freezing zone so as to be hard frozen and into a severing station, and
    consecutively breaking off an intruding front end of the extruded string as a product body at a following construction area of the extruded string.

2. A method according to claim 1, further comprising the step of consecutively collecting the respective product bodies on an underlying conveyor and conveying the product bodies at an increased speed with respect to the a conveying speed of the extruded string.

3. A method according to claim 1, wherein the step of subjecting the extruded string to constriction formation includes pressure forming adjacent ends of the product bodies by at least one tool.

4. A method according to claim 1, wherein the step of subjecting the extruded string to constriction formation includes controlling an extruder nozzle extruding the extruded string by varying and opening of the nozzle.

5. A system for providing extruded ice cream products, the system comprising:
    an extruder for extruding a string shaped extrusion product onto a conveyor belt passing through a freezing zone to a delivery position for hard frozen products severed from the string shaped extrusion product,
    means disposed adjacent the conveyor belt and spaced from a delivery end thereof for periodically forming a constriction in the string shaped extrusion product, and
    means disposed at a delivery end of the conveyor belt for consecutively breaking off a front end portion of the string shaped extrusion product at the respective constrictions.

6. A system according to claim 5, wherein said means for forming the constrictions include at least one of a cross movable knife and shaping tool parts mounted at a position between an entrance and an exit of the freezing zone.

7. A system according to claim 5, wherein said means for forming the constrictions include a controlled extruder nozzle having a variable nozzle opening.

8. A system according to claim 5, wherein said means for breaking off the front end portion of the string shaped extrusion products comprising a supporting anvil and a breaker roller spaced from said supporting anvil with an underside thereof located at a level below a level of a top side of the string shaped extrusion product.

* * * * *